US006476091B2

(12) United States Patent
White, III et al.

(10) Patent No.: US 6,476,091 B2
(45) Date of Patent: Nov. 5, 2002

(54) POLYOL COMPOSITION CONTAINING A HYDROCARBON BLOWING AGENT

(75) Inventors: Walter R. White, III, Trenton; Robert E. Riley, Brownstown; Jimmy L. Patterson, New Boston; James A. Mullins, Wyandotte, all of MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/995,947

(22) Filed: Nov. 28, 2001

(65) Prior Publication Data

US 2002/0061967 A1 May 23, 2002

Related U.S. Application Data

(62) Division of application No. 09/632,138, filed on Aug. 3, 2000, now Pat. No. 6,348,161.

(51) Int. Cl.$^7$ ............................................... C08G 18/48
(52) U.S. Cl. ........................ 521/173; 521/131; 521/167; 521/172; 521/174
(58) Field of Search ................................. 521/131, 167, 521/172, 173, 174

(56) References Cited

U.S. PATENT DOCUMENTS

| 5,360,900 A | | 11/1994 | DeLeon et al. |
| 5,922,779 A | | 7/1999 | Hickey |
| 6,100,308 A | * | 8/2000 | Guettes et al. ............... 521/131 |
| 6,107,359 A | * | 8/2000 | Dietrich et al. ........ 252/182.25 |

* cited by examiner

*Primary Examiner*—John M. Cooney, Jr.
(74) *Attorney, Agent, or Firm*—Fernando A. Borrego

(57) ABSTRACT

The present invention discloses a polyol resin composition containing a polyether polyol blend, a polyester polyol, and a hydrocarbon blowing agent. The polyether polyol blend has at least a diamine initiated polyol, a propylene oxide polyol, and a polyethylene terephthalate initiated polyol having a functionality of from 2.3 to 3.0. The polyester polyol is preferably a phthalic anhydride initiated polyester polyol. The blowing agent is a $C_4$–$C_6$ hydrocarbon. Also disclosed is a method of producing a polyurethane foam combining the above mentioned polyol resin and an isocyanate component.

4 Claims, No Drawings

POLYOL COMPOSITION CONTAINING A HYDROCARBON BLOWING AGENT

This application is a division of application No. 09/632,138, filed on Aug. 3, 2000, now U.S Pat. 6,348,161.

FIELD OF THE INVENTION

The present invention relates generally to dimensionally stable, rigid polyurethane/polyisocyanurate foams and to polyol blends used to make such foams. Particularly, the present invention relates to polyol blends containing a polyether polyol blend, a polyester polyol, and hydrocarbon blowing agent.

BACKGROUND OF THE INVENTION

Hydrocarbons are being employed in greater numbers as viable alternative blowing agents in the manufacture of rigid polyurethane or polyisocyanurate foams.

Due to the non-polar hydrophobic characteristics of hydrocarbons, they are only partially soluble in many polyols used to manufacture rigid polyurethane or polyisocyanurate foams. As a result of the poor solubility of hydrocarbon blowing agents, the blowing agent must usually be added to the polyol just prior to dispersing through a mix head. The limited shelf life of hydrocarbon-polyol mixtures has limited the ability of storing batches for later use.

Additional to the limited storage time for batches, is the potential limited process phase stability or limited resistance to separation into layers of different composition. If there is a phase separation during the process, often there may be non-uniform and uneven cell structures in the resultant polyurethane or polyisocyanurate foam. Such non-stable cell structure can lead to variations in the properties of a foam product, such as, the thermal conductivity which generally increases as a result of poor cell structure. Conversely, the R-factor, or insulative factor tends to decrease as a result of poor cell structure. Such a decrease in the R-factor would not be desirable in an application where the foam is to be used as an insulator, such as, for example, in a refrigerator door.

SUMMARY OF THE INVENTION

There is provided a phase stable polyol resin blend composition comprising a polyether polyol blend, a polyester polyol and a hydrocarbon blowing agent. The polyether polyol blend is present in an amount of at least 10 percent by weight of the polyol resin.

In one embodiment, the polyether polyol blend comprises a mixture of a toluene diamine and ethylene diamine co-initiated polyol having from 20 to 30 percent ethylene oxide and 70 to 80 percent propylene oxide, a sucrose and dipropylene glycol co-initiated propylene oxide polyol, and a polyethylene terephthalate initiated aromatic polyol blend having a functionality of between 2.3 and 3.0

In one embodiment, the polyester polyol utilized in the invention is a phthalic anhydride initiated polyester polyol having a hydroxyl number of at least 200 meq polyol/g KOH.

The hydrocarbon blowing agents used by the invention are $C_4$–$C_6$ hydrocarbons or mixtures thereof. The pentanes are particularly preferred and are present in the polyol resin in amounts of from 20 to 30 parts by weight of the polyol resin.

In one embodiment, the method of the invention comprises providing a polyether polyol blend having at least three polyols comprising a toluene diamine and ethylene diamine co-initiated polyol, a sucrose and dipropylene glycol co-initiated polyol and a polyethylene terephthalate initiated aromatic polyol blend; providing a polyester polyol; providing a $C_4$–$C_6$ hydrocarbon blowing agent; combining the polyether polyol blend, polyester polyol and blowing agent to form a polyol resin; providing a polyisocyanate component; providing a catalyst; and combining the polyol resin with the polyisocyanate component and catalyst to form a polyurethane foam.

DETAILED DESCRIPTION OF A PREFERRED EMBODIMENT

The phase stable polyol resin blend composition includes at least a polyether polyol blend, a polyester polyol and a hydrocarbon blowing agent.

The polyol resin blend composition is deemed to be phase stable when the blend composition has the capacity of retaining the hydrocarbon blowing agent in solution for a specified period of time; generally at least 24 hours. The determination as to the phase stability of the composition is measured by mixing the hydrocarbon blowing agent with the polyether polyol blend and polyester polyol in a clear container having a lid. The container is then agitated vigorously to fully mix the composition, and the container is allowed to stand undisturbed overnight. If there is no visible phase separation into distinct layers, or a cloudy appearance, then the composition is deemed to be phase stable.

Methods of forming polyoxyalkylene polyether polyols are well known, for example, by the base catalyzed addition of alkylene oxides to an initiator molecule containing reactive hydrogens such as a polyhydric alcohol. In one embodiment of the present invention, the initiator molecules are triols. Examples of such initiators include: glycerol; 1,1,1-trimethylolpropane; 1,1,1-trimethylolethane; 1,2,6-hexanetriol; pentaerythritol; and sorbitol. Other suitable initiators include both aliphatics and aromatics, such as ethylene glycol, propylene glycol, dipropylene glycol, trimethylene glycol, 1,2-butanediol, 1,3-buntanediol, 1,4-butanediol, 1,2-pentanediol, 1,4-pentanediol, 1,5-pentanediol, 1,6-hexanediol, 1,7-heptanediol. Also included within the term "polyhydric alcohol" are compounds derived from phenol such as 2,2-bis(4-hydroxyphenyl)propane, commonly known as Bisphenol A. The polyether polyols may be prepared by any known process such as, for example, the process disclosed by Wurtz in 1859, *Encyclopedia of Chemical Technology*, Vol. 7, pp. 257–262, Published by Interscience Publishers, Inc. (1951) or in U.S. Pat. No. 1,922,459.

Examples of useful alkylene oxides include ethylene oxide, propylene oxide, butylene oxide, amylene oxide, mixtures thereof, tetrahydrofuran, alkylene oxide-tetrahydrofuran mixtures, epihalohydrins, and aralkylene styrene. The alkylene oxides are added onto the initiator molecule and chain propagation is carried out in the presence of catalysts by either anionic polymerization or by cationic polymerization.

The preferred catalysts are potassium hydroxide, sodium hydroxide, alcoholates of potassium hydroxide, alcoholates of sodium hydroxide, cesium catalysts, amines, Lewis acid catalysts, or double metal complex catalysts, all of which are known in the art.

The polyol resin blend composition of the present invention contains a polyether polyol blend, a polyester polyol, and a $C_4$–$C_6$ hydrocarbon blowing agent. Other ingredients that may be included in the polyol resin blend composition are catalysts, surfactants, other blowing agents, flame retardants, fillers, stabilizers and other additives.

The polyether polyol blend useful in accordance with the present invention comprises at least a mixture of a diamine initiated polyol, a propylene oxide polyol and at least one polyethylene terephthalate (PET) initiated polyol.

The diamine initiated polyol is preferably a toluene diamine and ethylene diamine co-initiated polyol having from 20 to 30 percent ethylene oxide and 70 to 80 percent propylene oxide. The toluene diamine and ethylene diamine co-initiated polyol preferably has a nominal functionality of 4, with a hydroxyl number from 450 to 550 meq polyol/g KOH. Even more preferably the polyol has a hydroxyl number of 500 meq polyol/g KOH.

A particularly preferred diamine initiated polyol of the present invention includes Pluracol® 922, a toluene diamine and ethylene diamine co-initiated polyol commercially available from BASF Corporation (Mt. Olive, N.J.).

The propylene containing polyol is preferably a sucrose and dipropylene glycol co-initiated polyol. This polyol preferably only includes the initiators and propylene oxide.

The sucrose and dipropylene glycol co-initiated polyol preferably has a nominal functionality between 4 and 5 with a hydroxyl number from 350 to 450 meq polyol/g KOH. Even more preferably, the polyol has a hydroxyl number of 500 meq polyol/g KOH.

A particularly preferred propylene oxide polyol of the present invention includes Pluracol® 975, a sucrose and dipropylene glycol co-initiated polyol commercially available from BASF Corporation (Mt. Olive, N.J.).

The PET initiated polyol of the polyether polyol blend preferably is an aromatic polyol blend having a functionality of between 2.3 and 3.0. A particularly preferred PET initiated polyol blend is Terol® 375, commercially available from Oxid, Inc. (Houston, Tex.). The composition and method of producing Terol® 375 is described in U.S. Pat. No. 5,360,900 and is herein incorporated by reference.

The polyether polyol blend of the present invention preferably comprises 35 to 45 parts by weight of the toluene diamine and ethylene diamine co-initiated polyol, 40 to 50 parts by weight of the sucrose and dipropylene glycol co-initiated propylene oxide polyol, and 10 to 20 parts by weight of the PET initiated polyol all per 100 parts by weight of the polyether polyol blend. Even more preferably, the polyether polyol blend of the present invention comprises 40 parts by weight of the toluene diamine and ethylene diamine co-initiated polyol, 45 parts by weight of the sucrose and dipropylene glycol co-initiated polyol, and 15 parts by weight of the PET initiated polyol.

The overall amount of the polyether polyol blend is preferably at least 10 weight percent based on the overall weight of all polyol components in the polyol resin blend composition. Higher percentages may be utilized by the present invention, but at 10 percent by weight the polyol resin blend composition exhibits the desired phase stability. In addition a stable foam product can be formed at 10 percent by weight of the polyether polyol blend based on the overall weight of all polyol components in the polyol resin blend composition.

The polyester polyol of the resin blend composition of the present invention is preferably a phthalic anhydride initiated polyester polyol. Preferably, the polyester polyol has a hydroxyl number of at least 200 meq polyol/g KOH.

A particularly preferred polyester polyol of the present invention includes STEPANPOL® PS 2352, a phthalic anhydride initiated polyester polyol commercially available from Stephan Chemical Company (Northfield, Ill.).

The overall amount of the polyester polyol is preferably between 50 and 80 weight percent, more preferably between 60 and 70 weight based on the total weight of all of the polyols in the polyol resin blend composition.

In addition to the foregoing, the polyol resin blend composition of the present invention includes a blowing agent comprising a $C_4$–$C_6$ hydrocarbon and mixtures thereof. The blowing agent may be added and incorporated into the polyol resin blend composition for storage and later use in a foaming apparatus or may be added to a preblend tank in the foaming apparatus and incorporated in the blend composition prior to pumping the foaming ingredients to the mixhead. Alternatively, the blowing agent may be added to the foaming ingredients in the mixhead as a separate stream.

The amount of blowing agent is preferably from 20 to 30 parts by weight, even more preferably 27 parts by weight based on the total weight of all of the polyols in the polyol resin blend composition.

Examples of $C_4$–$C_6$ hydrocarbon blowing agents include butanes, pentanes, hexanes and mixtures thereof. Preferred blowing agents are the pentanes including isopentane, normal pentane, cyclopentane, and neopentane. The pentanes may be incorporated into the polyol resin blend composition of the present invention alone or as a blend of 2 or more of the pentanes. For example, normal pentane mixed with isopentane or cyclopentane may be utilized by the present invention. It is less desirable to utilize cyclopentane as the only blowing agent, as cyclopentane reaches a saturation point quickly and therefor may form a condensation during processing that may result in a poor cellular structure for the foam. However, mixtures having cyclopentane as a component may be utilized by the present invention.

The hydrocarbon blowing agents of the present invention are generally available from manufacturers of fractional distillation products from petroleum, including Phillips Petroleum and ExxonMobil Corporation.

The isocyanate component is preferably a polyisocyanate, herein defined as having 2 or more isocyanate functionalities, examples of these include conventional aliphatic, cycloaliphatic, and preferably aromatic isocyanates. Specific examples include: alkylene diisocyanates with 4,2,12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures 4,4'-2,2'- and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures, and 2,2'-diphenylmethane diisocyanate and the corresponding isomeric mixtures, mixtures of 4,4'-, 2,4'-, and 2,2-diphenylmethane diisocyanates and polyphenylene polymethylene polyisocyanates (crude MDI).

In one embodiment, the polyisocyanate component used in conjunction with the polyol resin blend composition of the present invention to produce an urethane foam diphenylmethane diisocyanate (MDI), polymeric MDI or a isocyanate terminated prepolymer comprising, for example, the reaction product of a polyester polyol and MDI. Generally, the isocyanate and the polyol resin blend composition are combined at an isocyanate index of from 150 to 300, with an index of preferably of from 200 to 250.

The catalysts used for the preparation of urethane foams are, in particular, components that accelerate the reaction of the hydroxyl groups of the polyol with the MDI component. Suitable catalysts are organic metal compounds, preferably organic tin compounds such as tin (II) salts of organic carboxylic acids, e.g., tin (II) acetate, tin (II) octoate, tin (II) ethylhexanate and tin (II) laurate, and the dialkyltin (IV) salts of organic carboxylic acids, e.g., dibutyltin diacetate, dibutyltin dilaurate, dibutyltin maleate, and dioctyltin diacetate. The organic metal compounds are used alone or preferably in combination with strongly basic amines. Examples which may be mentioned are amines such as 2,3-dimethyl-3,4,5,6-tetrahydropyrimidine or tertiary amines such as triethylamine, tributylamine; dimenthylbenzylamine; N-methylmorpholine; N-ethylmorpholine; N-cyclohexylmorpholine; N,N,N',N'-tetramethylethylenediamine; N,N,N',N'-tetramethylbutanediamine; N,N,N',N'-tetramethylhexane-1,6-diamine; pentamethyldiethylenetriamine; bis (dimethylaminoethyl) ether; bis (dimethylaminopropyl) urea; dimethylpiperazine; 1,2-dimethylimidazole; 1-azabicyclo [3.3.0] octane and preferably 1,4-diazabicyclo [2.2.2] octane. Additionally, one can use alkanolamine compounds such as triethanolamine; triisopropanolamine; N-methyldiethanolamine and N-ethyldiethanolamine and dimethylethanolamine.

Additional suitable catalysts include: tris (dialkylaminoalkyl)-s-hexahydrotriazines, in particular tris (N,N-dimethylaminopropyl)-s-hexahydrotriazine; tetraalkylammonium hydroxides such as tetramethylammonium hydroxide; alkali metal hydroxides such as sodium hydroxide and alkali metal alkoxides such as sodium methoxide and potassium isopropoxide and also alkali metal salts of long-chain fatty acids having from 10 to 20 carbon atoms and possibly lateral OH groups in combinations of the organic metal compounds and strongly basic amines. Preference is given to using from 0.001 to 5% by weight, in particular from 0.05 to 2% by weight, of catalysts or catalyst combination, based on the weight of the polyol.

In one embodiment, suitable catalysts are organic metal compounds, preferably organic potassium compounds such as potassium salts of organic carboxylic acids, e.g., potassium acetate, potassium octoate and potassium fornate. The organic metal compounds are used alone or preferably in combination with strongly basic amines. Examples of such amines are, 2,3-dimethyle-3,4,5,6-tetrahydropyrimide or tertiary amines such as triethylamine, tributylamine, dimenthybenzylamine. A particularly preferred amine of the present invention is pentamethyl diethylenetriamine (PMDETA).

Preferably the organic metal compound is present in an amount of from 2 to 3.5 parts by weight of the polyol resin blend composition, even more preferably at 2.5 parts by weight of the polyol resin blend composition. The basic amine is present in an amount of less than 1 part by weight of the polyol resin blend composition, preferably at 0.3 parts by weight of the polyol resin blend composition.

Suitable surface-active substances that may also be added include, for example, compounds, which serve to aid the homogenization of the starting materials and also may be suitable for regulating the cell structure. Examples which may be mentioned are emulsifiers such as the sodium salts of castor oil sulfates or fatty acids and also amine salts of fatty acids, e.g. Diethylamine oleate, diethylamine sterate, diethylamine ricinoleate, salts of sulfonic acid, e.g. Alkali metal or ammonium salts of dodecylbenzene-or dinaphthylmethanedisulfonic acid and ricinoliec acid; foam stabilizers such as siloxane-oxyalkylene copolymers and other organopolysiloxanes, ethoxylated alkylphenols, ethoxylated fatty alcohols, paraffin oils, castor oil or ricinoliec esters, Turkey red oil and peanut oil. Additives may also include cell regulators such as paraffins, fatty alcohols, dimethylpolysiloxanes. Oligomeric polyacrylates having polyoxyalkane and fluoroalkane radicals as side groups are also suitable for improving the emulsifying action, the cell structure and/or stabilizing the foam. The surface-active substances are usually employed in amounts of from 0.01 to 5 parts by weight, based on 100 parts by weight of the components other than the isocyanate component.

Suitable chain extender/crosslinkers that may be used include diols and/or triols having molecular weights of less than about 400. Examples of suitable chain extenders/crosslinkers are aliphatic, cycloaliphatic and/or aromatic diols having from 2 to 14, preferably from 4 to 10, carbon atoms, e.g., ethylene glycol; 1,3-propanediol; 1,10-decanediol; o-, m-, p-dihydroxycyclohexane; diethylene glycol; dipropylene glycol, and preferably 1,4-butanediol, 1,6-hexanediol and bis (2-hydroxyethyl) hydroquinone, triols such as 1,2,4- and 1,3,5-trihydroxyclyohexane, and low molecular weight hydroxyl-containing polyalkylene oxides based on ethylene oxide and/or 1,2-propylene oxide in the above-mentioned diols and/or triols as initiator molecules. These compounds are preferably used in amounts of from 0 to 20% by weight based on the total weight of the polyol resin blend composition.

Flame retardants that may be used include pentabromodiphenyl oxide; dibromopropanol; tris (β-chloropropyl) phosphate; 2,2-bis (bromoethyl) 1,3-propanediol; tetrakis (2-chloroethyl) ethylene diphosphate; tris (2,3-dibromopropyl) phosphate; tris (β-chloroethyle) phosphate; tris (1,2-dichloropropyl) phosphate; bis-(2-chloroethyl) 2-chloroethylphosphonate; molybenumtrioxide; ammonium molybdate; ammonium phosphate; pentabromodiphenyloxide; tricresyl phosphate; hexabromocyclododecane; melamine; and dibromoethyldibromocyclohexane. Concentrations of flame retardant compounds, which may be employed range from 50 to 25 parts per 100 parts of polyol resin blend composition.

The foam may further include fillers such as organic, inorganic and reinforcing fillers. Specific examples are: inorganic fillers such as siliceous minerals, for example, sheet silicates such as antigorite, serpentine, hornblends, amphiboles, chrysotile, zeolites, talc; metal oxides, such as kaolin, aluminum oxides, titanium oxides and iron oxides, meta salts, such as chalk, barite, aluminum silicates and inorganic pigments such as cadmium sulfide, zinc sulfide, and also glass particles. Examples of organic fillers are: carbon black, melamine, rosin, cyclopentadienyl resins. The organic and inorganic fillers can be used individually or as mixtures and are advantageously incorporated into the reaction mixture in amounts of from 0.5 to 50% by weight based on the weight of the polyol and the isocyanate component.

To form the foam of the present invention the polyol resin blend composition, catalyst and any other components are premixed to form a resin. After formation of the resin, the resin is combined in a mixhead with the polyisocyanate component and the mixture is processed by any of the methods commonly known in the art. For example, foam may be produced using reaction injection moldings, in an open or closed mold, or in a pour in place application where the surfaces contacting the reaction mixture become a part of the finished article.

Foams may also be produced by a continuous laminate process, which process is well known in the industry.

| Component | Parts by Weight |
|---|---|
| Polyol A | 10 |
| Polyol B | 90 |
| Polycat 5 (amine catalyst) | .3 |
| Potassium octoate (organic metal catalyst) | 2.5 |
| Polyisocyanate component | 157 |
| Isocyanate Index | 2.50 |

Polyol A is a polyether polyol blend having: 40 parts of a toluene diamine and ethylene diamine co-initiated polyol, 45 parts of a sucrose and dipropylene glycol co-initiated polyol, 45 parts of a polyethylene terephthalate initiated aromatic polyol blend. and 27 parts of a pentane blowing agent.

Polyol B is a phthalic anhydride initiated polyester polyol having a hydroxyl number of about 200 meq poly/g KOH.

Polycat 5 is an amine catalyst containing pentamethyl diethylenetriamine.

Potassium octoate is an organo-metal catalyst.

Polyisocyanate component is an isocyanate-terminated prepolymer, which is the reaction product of a polyester polyol with a stoichiometric excess of MDI.

All the components with the exception of the isocyanate terminated prepolymer are premixed to form a polyol resin blend composition. The resin blend composition is then mixed with the isocyanate-terminated prepolymer to form a foam and the foam is allowed to free rise and cure.

The resulting polyol resin blend composition forms a phase stable polyol blend that does not separate into distinct composition layers; thereby producing an improved dimensionally stable foam. The improved dimensional stability or cell structure results in a foam having excellent thermal conductivity properties.

The present invention has been described in accordance with the relevant legal standards, thus the foregoing description is exemplary rather than limiting in nature. Variations and modifications to the disclosed embodiment may become apparent to those skilled in the art. Accordingly, the scope of legal protection afforded this invention can only be determined by studying the following claims.

What is claimed is:

1. A method for forming a polyurethane foam comprising the steps of:
    a) providing a polyether polyol blend comprising a mixture of:
        1) a toluene diamine and ethylene diamine co-initiated polyol having from 20 to 30 percent ethylene oxide and 70 to 80 percent propylene oxide;
        2) a sucrose and dipropylene glycol co-initiated propylene oxide polyol; and
        3) a polyethylene terephthalate initiated polyol blend having a functionality of between 2.3 and 3.0;
    b) providing a polyester polyol;
    c) providing a $C_4$–$C_6$ hydrocarbon blowing agent;
    d) combining the polyether polyol blend, polyester polyol and blowing agent to form a polyol resin;
    e) providing a polyisocyanate component
    f) providing a catalyst; and
    g) combining the polyol resin with the polyisocyanate component and catalyst to form a polyurethane foam.

2. A method as recited in claim 1 wherein the method further includes providing a toluene diamine and ethylene diamine co-initiated polyol in an amount from 35 to 45 parts by weight based on 100 parts of the polyether polyol blend.

3. A method as recited in claim 1 wherein the method further includes providing a sucrose and dipropylene glycol co-initiated polyol in an amount of from 40 to 50 parts by weight based on 100 parts of the polyether polyol blend.

4. A method as recited in claim 1 wherein the method further includes providing a polyethylene terephthalate initiated polyol blend in an amount of from 10 to 20 parts by weight based on 100 parts of the polyether polyol blend.

* * * * *